May 21, 1940.  C. PAULSON  2,201,562
ELECTRICAL TESTING APPARATUS
Filed May 14, 1938
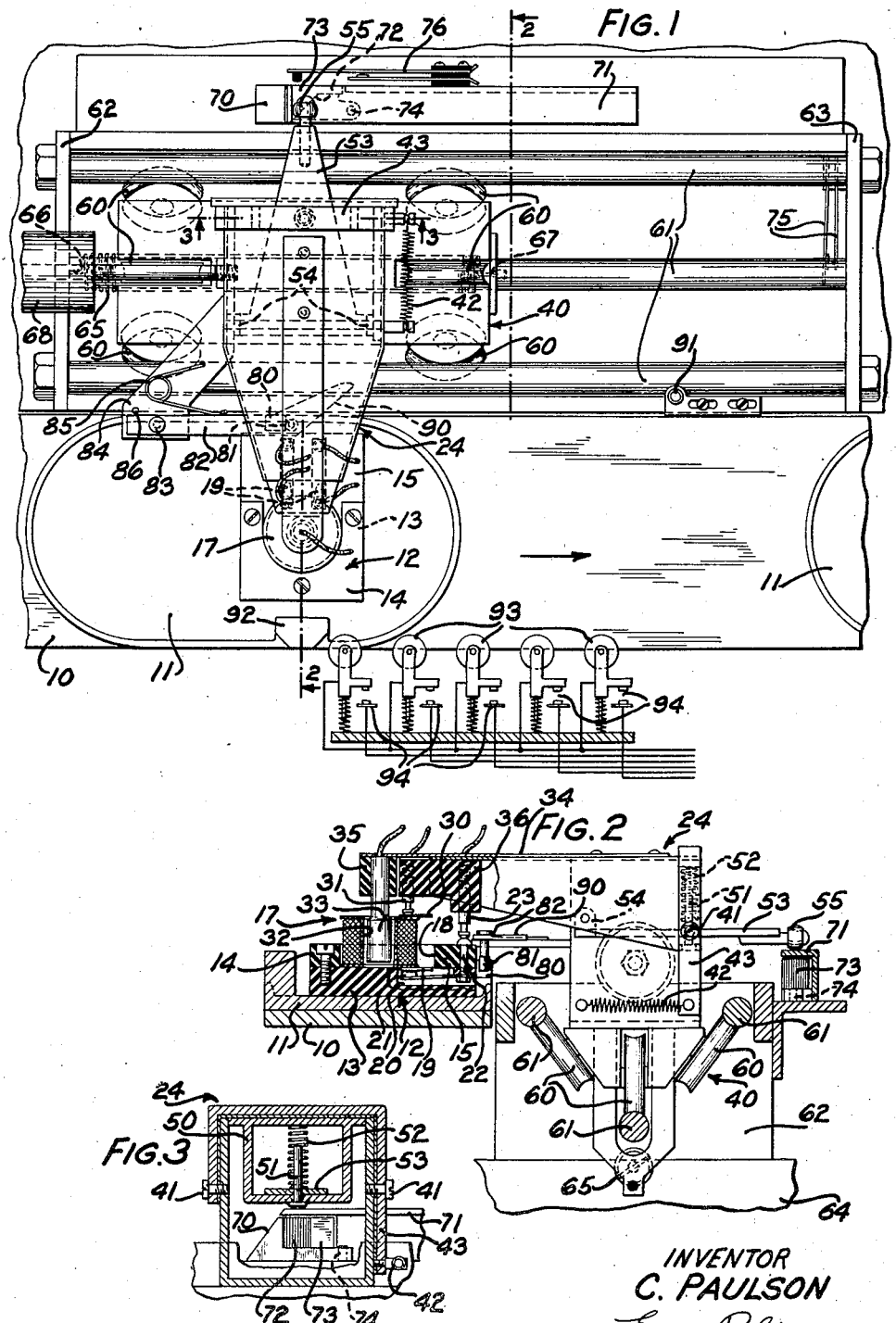
INVENTOR
C. PAULSON
BY Emery Robinson
ATTORNEY Patented May 21, 1940

2,201,562

UNITED STATES PATENT OFFICE 2,201,562

ELECTRICAL TESTING APPARATUS

Christian Paulson, Elmhurst, Ill., assignor to Western Electric Company, Incorporated, New York, N. Y., a corporation of New York Application May 14, 1938, Serial No. 207,927

14 Claims. (Cl. 175—183)

This invention relates to electrical testing apparatus and more particularly to testing apparatus for automatically making a series of tests of a piece of electrical apparatus as it moves past a testing position on a conveyor system.

It is an object of the present invention to provide a simple apparatus for expeditiously testing electrical apparatus.

In accordance with one embodiment of the invention, a jig or fixture travelling on the conveyor belt of a conveyor system carries a coil, such as, for example, an induction coil for use in telephone apparatus, past a testing station where the coil is to be subjected to a series of electrical tests. The jig is provided with an abutment for engaging a part of the apparatus in the testing station to cause an arm, mounted on a travelling carriage, to move a search coil into the coil under test and to cause the terminals of the coil under test to be interconnected with certain electrical testing circuits. As the jig moves through the testing station, the carriage will travel with it and a second abutment on the jig will automatically and in sequence actuate a series of circuit closing switches to render the electrical testing circuits effective. As soon as the jig reaches a predetermined point where the tests have been completed, the movable arm of the carriage will be disengaged from the coil and the carriage will move to its normal position under spring pressure to put it in readiness for the next jig on the conveyor belt.

An understanding of the details of the invention may be had by reference to the following detailed description when considered in conjunction with the accompanying drawing, wherein Fig. 1 is a plan view of a section of a conveyor system wherein the testing apparatus is located;

Fig. 2 is a transverse sectional view, taken along the line 2—2 of Fig. 1 in the direction of the arrows showing the details of construction of the travelling carriage, and Fig. 3 is a fragmentary sectional view taken on the line 3—3 of Fig. 1 showing the construction of the movable arm of the carriage.

Referring to the drawing, wherein like reference characters designate the same parts throughout the several views, the numeral 10 designates a conveyor belt forming a part of a conveyor system for transferring parts of telephone apparatus between the various assembly and testing stations of the conveyor system wherein the parts of the apparatus are assembled and tested. The belt 10 carries a plurality of jigs 11, all exactly the same in construction.

Mounted on the jig 11 is a coil supporting block 12 of insulating material composed of a base 13 and cooperating coil receiving members 14 and 15 which have semi-circular cut-outs to receive the spool head of a coil, designated generally by the numeral 17. The member 15 is cut out along the line 18 (Fig. 2) to receive terminals 19 of the coil under test. Secured to the member 15 (Fig. 2) and mounted in a depression 20 in the member 13 is a spring-pressed contactor 21, which is held in the member 15 by means of a bolt 22, which not only serves to hold the contactor 21 in engagement with the terminals 19, but also serves as an extension of the terminal 19 since the upper end of the bolt 22 is adapted to be engaged by a spring-pressed plunger 23 mounted in a pivoted arm, designated generally by the numeral 24.

The coil 17 has, in addition to the terminals 19, a pair of terminals 30 mounted directly above the terminals 19 and adapted to be engaged by spring-pressed plungers 31, also carried by the left end (Fig. 2) of the arm 24. As will be apparent by reference to Fig. 2, the induction coil 17 has a central aperture 32 into which a search coil 33 may be moved. The search coil 33 is mounted at the left end (Fig. 2) of a spring 34 secured to the arm 24 which is substantially U-shaped in cross-section (Fig. 3) and carries an insulator 36 for supporting the contactors or plungers 31 and 23, respectively. Another insulator 35 mounted on the spring 34 supports the search coil 33.

The arm 24 is pivoted on a carriage, designated generally by the numeral 40, by means of a pair of pivot pins or trunnions 41 and is normally urged out of the position shown in Fig. 2 by a contractile spring 42 fixed to the lower end of a substantially U-shaped bar 43, which is fixed to and extends over the arm 24. A rectangular bracket 50 (Fig. 3) is fixed to the underside of the arm 24 and has a pin 51 mounted in its base and extending upwardly therefrom. Surrounding the pin 51 is a compression spring 52, which engages the upper surface of the bracket 50 and normally holds a plate 53 in the position shown, where it rests on the base of the bracket 50. This plate 53 is pivoted at 54 to the arm 24 and carries at its right end (Fig. 2) a roller 55.

The carriage 40 is provided with six rollers 60—60, which engage three rods 61—61 comprising the trackway for the carriage. The rods 61—61 are fixed at their ends in end plates 62 and 63, mounted upon a suitable base 64, and serve to rigidly support the carriage in any of its positions. A contractile spring 65 connected to the end plates 62 at 66 (Fig. 1) and to the carriage at 67 normally tends to draw the carriage to the left and a dash pot 68, with the usual plunger is provided to prevent a too rapid return of the carriage to its normal position, when it is released by the jig 11.

The arm 24, which is normally held tilted out of the position shown in Fig. 2 by the spring 42, is moved downwardly to the position shown in Fig. 2 by the roller 55 on plate 53, riding up over a cam surface 70 formed on a pivoted member 73 and onto a track 71 when the carriage 40 is moved to the right (Fig. 1). The arm 24 will be maintained in the position shown in Fig. 2 while the roller 55 traverses the track 71. However, as soon as the roller 55 reaches the right end (Fig. 1) of the track 71, it will drop down off the track and the arm 24 will be tilted by the spring 42. The roller 55 will thus be permitted to pass back under the track 71 to normal position and in so doing, the end of the roller 55 will engage a cam face 72, formed on the member 73 and cam the member 73 about its pivot 74. As the carriage 40 reaches the extreme end of its travel to the right (Fig. 1), it will momentarily close a pair of contacts 75, and as it returns to normal, will cause the member 73 to open a pair of contacts 76 momentarily to control the electrical circuits (not shown) of the apparatus.

The carriage 40 is moved to the right by an abutment 80 on the jig 11 engaging a pin 81 mounted on the right end (Fig. 1) of a lever 82. The lever 82 is pivoted at 83 upon an arm 84 fixed to the side of the carriage. A spring 85 engages the arm 84 and lever 82 to normally hold the lever 82 against a stop pin 86, as shown in Fig. 1, where the pin 81 will be in the path of the abutment 80. The lever 82 has a cam surface 90 formed thereon, adapted to engage a roller 91 as the carriage reaches the end of its travel to the right (Fig. 1), to cam the pin 81 out of the path of the abutment 80, thereby to permit the spring 65 to draw the carriage back to its normal position.

As the abutment 80 moves the carriage 40 to the right (Fig. 1), a cam 92, formed on the jig 11, will engage a plurality of spring pressed rollers 93—93 in succession to momentarily close contacts 94—94 associated with the rollers 93 in automatic succession to complete various circuits in the testing apparatus in a predetermined order to make the desired tests.

It is believed that a better understanding of the invention will be had from the following brief description of the apparatus, starting with the carriage in its extreme left position, slightly to the left of that shown in Fig. 1, where the arm 24 will be tilted out of the position shown in Fig. 2. As the jig 11 moves in the direction of the arrow, (Fig. 1) on the belt 10, the abutment 80 will strike the pin 81 to move the carriage to the right (Fig. 1). As the carriage moves to the right, roller 55 will engage the cam surface 70 and pass up onto the track 71. In so doing, the arm 24 will be tilted to the position shown in Fig. 2, where the search coil 33 will be within the aperture 32 of coil 17. If the head of the coil 17 is improperly formed or if for any other reason the search coil 33 strikes an obstruction and is prevented from moving to its position, as shown in Fig. 2, the spring 34 will be flexed and if some other obstruction prevents the arm 24 from moving the plungers 23 and 31 to the position shown in Fig. 2 the spring 52 will be compressed and the contacts 94—94 will be closed in automatic succession, but the plungers 31 and 23 will not complete the circuits through the coil terminals and the apparatus will therefore not be harmed nor will a false indication of the characteristics of the coil be given. However, if the search coil 33 enters the coil 17, and the plungers 23 and 31 engage the bolt 22 and coil terminal 30, respectively, the circuits of the apparatus will be connected to the terminals 19 and 30 of the coil, and as the carriage 40 moves to the right, the various electrical tests will be made, and just before the carriage reaches its extreme right-hand position, the roller 55 will come to the end of the track 71 and will drop down, permitting the spring 42 to tilt the arm 24 and withdraw the search coil 33 from the coil 17 under test and disengage contacts 23 and 31. The carriage will cause the closure of the contact 75 and thereupon the camming surface 90 of lever 82 will have been moved sufficiently by the roller 91 to move the pin 81 out of the path of the abutment 80, whereupon the spring 65 will rapidly draw the carriage 40 back to the normal position, where the next succeeding jig 11 will initiate a second testing operation.

Although a specific embodiment of the invention has been described hereinbefore, it will be understood that it is subject to many modifications and adaptations and is to be limited only by the scope of the appended claims.

What is claimed is:

1. Electrical testing apparatus, including a search coil, a plurality of circuits adapted to be operated in sequence, a jig for supporting an article to be tested, and means actuated by said jig for moving the search coil into association with the article to be tested.

2. Electrical testing apparatus, including a search coil, a plurality of circuits adapted to be operated in sequence, a jig for supporting an article to be tested, means actuated by said jig for moving the search coil into association with the article to be tested, and means on said jig for completing said circuits.

3. Electrical testing apparatus, including a search coil, a series of electrical circuits adapted to be operated in sequence, a jig for supporting an article to be tested, means for moving said jig through a predetermined path, and means actuated by said jig for moving the search coil into association with said article and for automatically returning said search coil to normal position.

4. An electrical testing apparatus, a jig for supporting an article to be tested, means for moving said jig through a predetermined path, a testing member, a carriage for pivotally supporting said testing member, means on said jig for moving said carriage through a predetermined path, and means associated with said carriage for moving said testing member into association with the article.

5. In an electrical testing apparatus, a search coil, a pivoted arm for supporting said search coil, and means for moving said search coil into association with an article to be tested while the search coil and article are moving in a predetermined plane.

6. A testing apparatus including a search coil, means for movably supporting said coil, a carriage for carrying said means through a predetermined path, and means operable in response to movement of said carriage in one direction for moving said supporting means to move the search coil into association with an article to be tested.

7. A testing apparatus including means for moving an article to be tested through a predetermined path, a test member, means for movably supporting said test member, a reciprocable carriage for carrying said supporting means through a predetermined path, and means for moving said supporting means into association with said article during the movement of the carriage through said path in one direction.

8. A testing apparatus including means for moving an article to be tested through a predetermined path, a test member, means for movably supporting said test member, a reciprocable carriage for carrying said supporting means through a predetermined path parallel to the path of the article, and means for moving said supporting means into association with said article during the movement of the article through said path and for permitting the supporting means to move out of association with the article at the end of said path.

9. In a testing apparatus, a travelling carriage movable through a predetermined path, a test member pivotally mounted on said carriage, a track adjacent the path of said carriage, means associated with said test member for cooperating with said track to move said test member about its pivot, and means adjacent said track for rendering the test member operative during movement of the test member and carriage.

10. In a testing apparatus, a travelling carriage, an arm pivoted on said carriage, a roller carried by said arm, a track adjacent the path of travel of the carriage and in the path of said roller, and means for guiding the roller onto the track during movement of the carriage in one direction and movable out of the path of the roller upon movement of the carriage in the opposite direction.

11. In a testing apparatus, an article supporting jig movable in a predetermined path, an abutment formed on said jig, a testing element, a carriage for supporting the testing element, a pin carried by said carriage and normally positioned in the path of the abutment on the jig for moving the carriage, and means for camming the pin out of the path of the abutment at the end of travel of the carriage.

12. In a testing apparatus, an article supporting jig movable in a predetermined path, an abutment formed on said jig, a testing element, a carriage for supporting the testing element, a pin carried by said carriage and normally positioned in the path of the abutment on the jig for moving the carriage, means for camming the pin out of the path of the abutment at the end of travel of the carriage, and means associated with the carriage for moving the testing element into association with the article on the jig.

13. In a testing apparatus, an article supporting jig movable in a predetermined path, an abutment formed on said jig, a testing element, a carriage for supporting the testing element, a pin carried by said carriage and normally positioned in the path of the abutment on the jig for moving the carriage, means for camming the pin out of the path of the abutment at the end of travel of the carriage, means associated with the carriage for moving the testing element into association with the article on the jig, a normally closed electrical contact, and means controlled by the testing element moving means for opening said contact upon movement of the carriage in one direction.

14. Electrical testing apparatus including a search coil, a plurality of circuits adapted to be operated in sequence, a jig for supporting an article to be tested, means actuated by said jig for moving the search coil into association with the article to be tested, and means on said jig for completing said circuits during movement of the coil and article.

CHRISTIAN PAULSON.